United States Patent [19]
DeCorso et al.

[11] 3,736,358
[45] May 29, 1973

[54] PROCESS FOR IRON ORE REDUCTION AND ELECTRIC FURNACE FOR IRON ORE REDUCTION HAVING AT LEAST ONE NONCONSUMABLE ELECTRODE

[75] Inventors: Serafino M. DeCorso, Pittsburgh; Armin M. Bruning, Export, both of Pa.

[73] Assignee: Westinghouse Electric Corporation, Pittsburgh, Pa.

[22] Filed: July 30, 1971

[21] Appl. No.: 167,820

Related U.S. Application Data

[62] Division of Ser. No. 584,799, Oct. 6, 1966, abandoned.

[52] U.S. Cl. .................................. 13/9, 13/18, 13/33
[51] Int. Cl. .................................................. H05b 7/08
[58] Field of Search ............................... 13/9, 18, 33

[56] References Cited

UNITED STATES PATENTS

| | | | |
|---|---|---|---|
| 2,801,156 | 7/1957 | Udy | 13/33 X |
| 3,163,521 | 12/1964 | Rinesch | 13/9 UX |
| 3,369,067 | 2/1968 | DeCorso | 13/18 |

*Primary Examiner*—Roy N. Envall, Jr.
*Attorney*—A. T. Stratton, C. L. McHale and M. I. Hull

[57] ABSTRACT

Furnace apparatus for iron ore reduction comprises a furnace having a wall composed of refractory material and non-consumable electrode apparatus having at least one axially extending passageway therethrough mounted in the furnace, and means for energizing the electrode apparatus and producing an arc which melts the ore and liquifies the same.

2 Claims, 8 Drawing Figures

PATENTED MAY 29 1973 3,736,358

PROCESS FOR IRON ORE REDUCTION AND ELECTRIC FURNACE FOR IRON ORE REDUCTION HAVING AT LEAST ONE NONCONSUMABLE ELECTRODE

This application is a division of copending application Ser. No. 584,799, filed Oct. 6, 1966 (now abandoned).

This invention relates to an improved process for iron ore reduction, and to an improved electric furnace for iron ore reduction having at least one non-consumable electrode, and more particularly the invention provides a process employing means for feeding ore and reducing agents through or around an electrode or electrodes to the arc zone, and removing generated gas from the arc furnace to an ore preheater where it is burned with air to preheat the ore, preheated ore being then fed to the arc furnace.

It has been proposed heretofore to feed material through the axial passageway of an electrode into an arc furnace. Cylindrical shaped electrodes are old in the art, one of the earliest being described in U.S. Pat. No. 510,777 issued Dec. 12, 1893. It is also old in the art to feed material through the axial passageway of an electrode into an arc furnace, one such patent being U.S. Pat. No. 3,101,385, issued Aug. 20, 1963.

Whereas the last-named patent provides means for introducing a gas into the furnace, it appears that a monotomic gas is introduced solely for the purpose of bringing the gas into the arc zone to increase the temperature of the arc zone.

We provide a furnace employing a nonconsumable electrode. The electrode itself constitutes no part of our invention. A suitable non-consumable electrode is described and claimed in the copending patent application of S. M. DeCorso for "Electrode", Ser. No. 479,965, filed Aug. 16, 1965 and assigned to the assignee of the instant invention.

In summary, the nonconsumable electrode includes means forming a fluid cooled arcing surface, a supporting structure for the arcing surface forming means with fluid inlet and fluid outlet passageways, and a field coil disposed at least partially within the arcing surface forming means and setting up a magnetic field which causes the arc to rotate substantially continuously around the annular arcing surface. In addition, the electrode has a preferably central passageway extending axially the entire length thereof, and the surface of said passageway may be protected by heat shield means, for example, a ceramic coating having refractory properties, and also the outside surface of the electrode including at least the portion of the supporting structure near the arcing zone may be covered with a heat shield composed for example of ceramic.

In summary, our improved method or process of ore reduction includes forming a layer of melt in a furnace having means for tapping the melt and means for discharging slag, and in one embodiment thereof the process includes the step of forming an arc from a nonconsumable electrode to the melt and introducing ore and reducing agents through the axial passageway of the electrode into the melt. In another method the process includes the step of utilizing a jacket enclosing the electrode and spaced therefrom to form an additional passageway, for introducing either ore or a reactant through the axial passageway of the electrode, and introducing either ore or a reactant through the additional passageway. And in still another process, we surround the electrode with two spaced jackets or sleeves, introduce ore through the passageway of the electrode, and introduce first and second reactants or reducing agents through the tubular passageways between the adjacent sleeve and the electrode, and between the adjacent sleeve and the outer sleeve.

In still another process, we utilize the passageway through the electrode as desired to introduce a reducing agent or reactants and provide means for introducing ore at a plurality of spaced positions around the wall of the furnace.

In summary, our improved furnace includes the combination of a furnace with a nonconsumable electrode having an axial passageway therethrough; a furnace with a nonconsumable electrode having an axial passageway therethrough and having a jacket formed therearound for introducing ore, reactants or reducing agents; a furnace and a nonconsumable electrode having an axial passageway therethrough with two spaced jackets therearound providing three passageways through which ore, reactants or reducing agents may be introduced.

Another embodiment of our invention includes a furnace having three electrodes mounted horizontally, in which the arc takes place not between the electrode and the melt, but between the electrodes themselves. Further we provide furnace apparatus with a nonconsumable electrode and having means for introducing ore into the furnace around the sides thereof; further we provide a system including an arc furnace and including an ore preheater in which gas generated in the furnace is combined with combustion air and fed to an ore preheater. The ore after being preheated is then fed into the arc furnace.

Accordingly, a primary object of our invention is to provide a new and improved process of ore reduction.

Another object of our invention is to provide a new and improved process of ore reduction utilizing a furnace with a nonconsumable electrode.

A further object of our invention is to provide a new and improved furnace apparatus for iron ore reduction employing a nonconsumable electrode.

An additional object is to provide a new and improved furnace for iron ore reduction employing a nonconsumable electrode with a passageway therethrough for the introduction of ore and/or reducing agents.

Still an additional object is to provide new and improved furnace apparatus employing a nonconsumable electrode having a passageway therethrough and having at least one jacket therearound spaced therefrom, the passageway through the electrode and the passageway between the jacket and the electrode providing means for introducing ore and reducing agents into the furnace.

These and other objects will become more clearly apparent after a study of the following specification, when read in connection with the accompanying drawings, in which:

FIG. 1 is a view partially in section of a nonconsumable electrode which may be employed in our invention, and is based upon the aforementioned patent application of S. M. DeCorso for "Improved Electrode", Ser. No. 479,965, filed Aug. 16, 1965;

Figure 1:
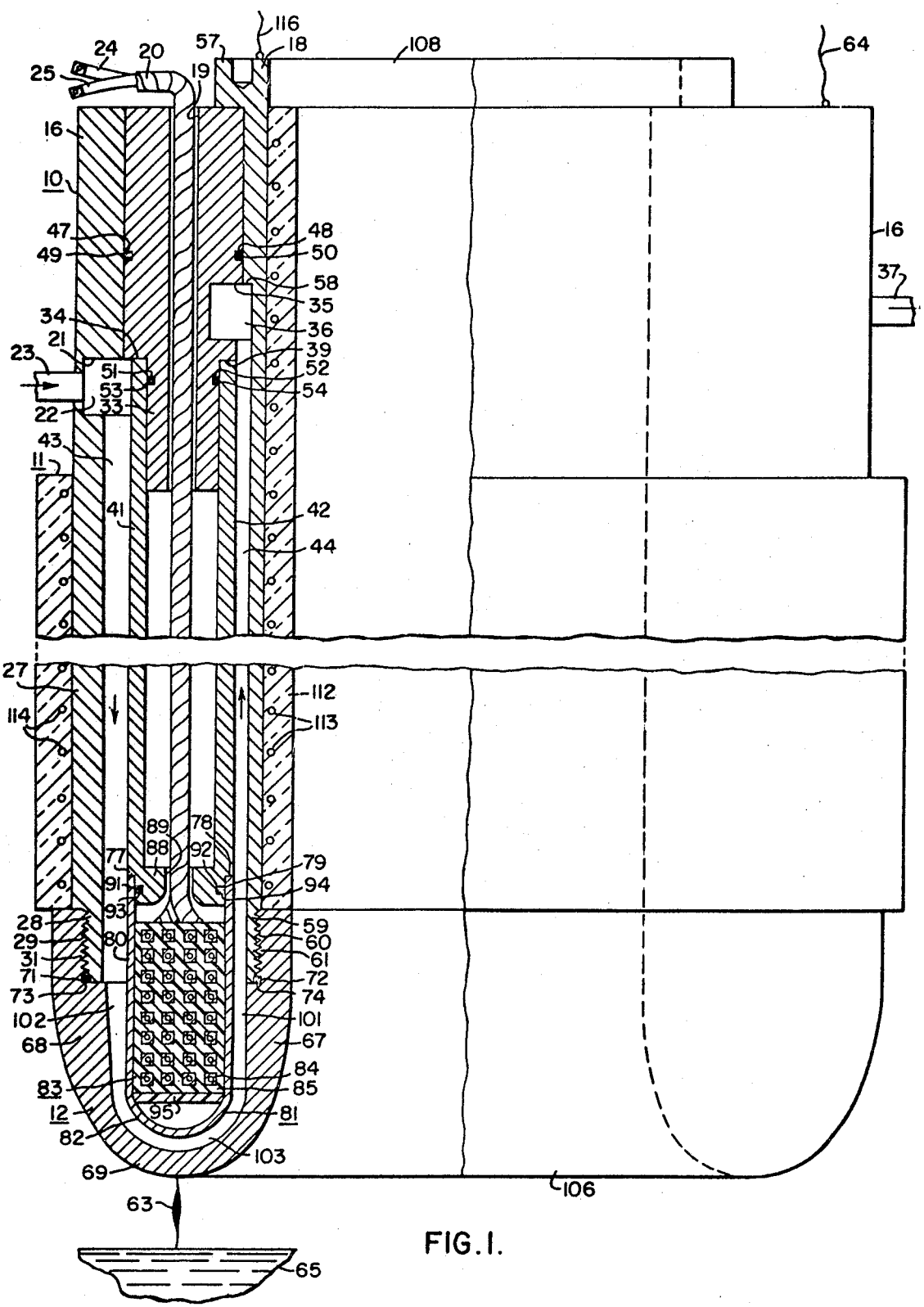

Referring now to the drawings for a more detailed understanding of the invention and in particular to FIG. 1, the electrode has a tubular body portion generally designated 10, an outside heat shield generally designated 11, and an electrode face member or tip member generally designated 12, composed of highly heat conductive and electrically conductive material such as copper and providing an arcing surface. The upper or head portion of the electrode is seen to include three concentric sleeves or tube portions 16, 17 and 18, the tube portion 17 having an axially extending bore 19 therethrough for the passage of lead sheath 20 to a field coil hereinafter to be described.

Outer tube or sleeve 16, which may be composed of, for example, steel but is preferably composed of a material having both mechanical strength and good electrical conductivity, has an annular groove or channel cut therein and extending around the entire tube, the groove being shown at 21 and being provided to form a fluid header 22 connected by fluid inlet means 23 with a suitable source of cooling fluid, not shown, such as water under pressure. Below the groove 21, or in the lower portion of tube 16, there is a portion of increased inner diameter 27, terminating in a portion 28 at the bottom thereof of reduced outer diameter and reduced wall thickness and having threads 29. The threads 29 are in threaded engagement with threads 21 of the aforementioned electrode face member 12 hereinafter to be described in greater detail.

The aforementioned sleeve or tubular portion generally designated 17 is seen to be relatively thick and to have a lower portion 33 which is of both reduced outer diameter and increased inner diameter. The outside wall of the tube 17 is cut in a manner to form a shoulder 34 which aligns with the upper wall of the aforementioned fluid header 22. The inside wall of the tubular portion 17 has a cut away portion 35 to form an annular fluid header 36 which communicates with a fluid outlet 37. The inside wall of the tubular member 17 is shaped in such a manner as to form a shoulder 39 as shown.

Abutting against the aforementioned shoulders 34 and 39 are two cylindrical concentric sleeves 41 and 42, which are provided for purposes to be hereinafter described in detail, but it may be stated here that sleeve 41 has an outer diameter so as to provide a cylindrical space 43 between the outer wall of the sleeve and the inner wall of the aforementioned tube portion 27, the cylindrical space 43 providing a cylindrical fluid flow passage for conducting fluid from the aforementioned fluid header 22 to the aforementioned electrode tip or electrode face member 12. In like manner, the cylindrical sleeve 42 has an inside diameter so that a cylindrical space 44 is formed between sleeve 42 and the adjacent wall of the aforementioned tube or sleeve 18, the space 44 forming a fluid flow passage and being provided for conducting fluid from electrode face member 12 to the fluid header 36 and thence to fluid outlet 37.

The tubular portion 17 is also seen to have two annular grooves 47 and 48 therein for containing O-rings 49 and 50 respectively. These provide for sealing between the adjacent tubes. Tube 17 also has annular grooves 51 and 52 therein for O-rings 53 and 54 respectively. These annular grooves 47 and 48 and 51 and 52 with their respective O-rings are desirable for providing fluid-tight seals between the adjacent tubular portions of the electrode body.

The aforementioned tubular portion 18 of the electrode body is seen to have an upper flange portion 57, a cut away portion forming shoulder 58, and a threaded bottom end portion 59 having threads 60. Shoulder 58 is plane with the upper wall of the aforementioned fluid header 36, as shown. Threads 60 mesh with threads 61 on the aforementioned electrode face member 12.

The tubular body portion of the electrode, at least a portion of which is composed of electrically conductive material, brings an electrical current for producing and sustaining an arc 63 from the electrode face member 12 to a surface of opposite polarity, a melt or another electrode. Means symbolized by lead 64 is connected to one terminal of a source of electrical potential, not shown, which has the other terminal thereof operatively connected to the aforementioned surface of opposite polarity, illustrated by melt 65. The arc 63 may take place to a melt which is composed at least partially of conductive material. Where alternating current is used to produce and sustain the arc, because of the skin effect, most of the current may flow to the arc 63 along the outer tube 16, and preferably this tube 16 is electrically conductive or at least has an electrically conductive coating thereon.

The aforementioned electrode face member is generally in the form of an annular cup having generally cylindrical inner wall portion 67, generally cylindrical outer wall portion 68, and an annular bottom wall portion arcuate in cross-section 69. The aforementioned threads 31 are on the inner surface of the upper end of the outer wall portion 68, and aforementioned threads 60 are on the surface of the upper end of the aforementioned inner wall portion 67 which is adjacent tube 18, these threads 31 and 60 being in threaded engagement with threads on the lower ends of concentric tubes 16 and 18 respectively, as shown. Two annular grooves 71 and 72 contain O-rings 73 and 74 respectively for providing effective fluid seals.

The lower ends of the aforementioned cylindrical sleeves 41 and 42, which may be, if desired, joined to each other by an annular end ring 88, which may be formed integrally with sleeves 41 and 42, are shaped to provide annular shoulders 77 and 78 respectively so that the lower ends of the sleeves will receive the inner and outer cylindrical walls of a generally annular cup-shaped field coil housing and fluid channeling member generally designated 81. Disposed inside the coil housing and fluid channeling member 81 is a field coil generally designated 83 consisting of a plurality of turns 84 embedded in insulation 85 and having fluid flow passages therethrough. The leads 24 and 25 to the coil generally designated 83 are seen to pass into an aforementioned sheath 20, which passes through a bore or aperture 89 in the annular end ring 88 which joins the bottoms of the sleeves 41 and 42. O-rings 91 and 92 in grooves 93 and 94 respectively provide fluid tight seals between the outer and inner walls 80 and 79 of the annular cup-shaped coil holder generally designated 81 and the adjacent walls of the sleeves 41 and 42. There is an annular ring of heat resistant insulating material 95 in cup member 81 which supports the bottom of the coil 83.

It is seen that the annular cup-shaped coil housing member generally designated 81 provides annular space 101 between Wall 79 of the coil housing 81 and wall 67 of the electrode face member 12; coil housing member 81 also provides annular space 102 between wall 80 of housing 81 and wall 68 of electrode face member 12; the curved annular bottom 82 of coil housing 81 is spaced from arcuate end portion 69 of electrode face member 12 to provide an annular passageway 103, arcuate shaped, joining fluid flow passages 101 and 102. The result of the annular passageways 101–103–102 is that fluid entering the passageway 43 flows around all the entire back surfaces of the wall portions 68–69–67 of the electrode face member generally designated 12; this fluid flowing through the passageways 102–103–101, which annular passageways extend around the entire perimeter or circumference of the electrode face member 12 from which arc 63 takes place, provide that heat flux, conducted to the outer surface of the face member 12 by radiation and convection from the melt and the hot gases, and also heat flux created by the intensely hot arc spot of arc 63, are transferred to the fluid and removed by way of passageway 44, outlet fluid header 36, and fluid outlet 37.

The electrode is seen to have a large substantially central passageway 106 tending the entire length thereof, this passageway 106 being open at the top of the electrode unless covered by a removable cover plate 108. Passageway 106 permits material to be fed to the melt 65 through the electrode, and also may be used for inserting fuse material to start the arc 63.

It is seen that an annular or cylindrical heat shield composed of highly heat resistant or refractory material such as a heat resistant ceramic 111 extends from the upper surface of electrode face member 12 the entire length of the inner passageway 106 through the electrode. Heat shield 112 as well as the aforementioned heat shield 11 may have reenforcing wires extending therethrough, these being shown at 113 and 114 respectively.

If desired, an additional electrical lead 116 may be connected to the tube 18 of the supporting structure, lead 116 being connected to the same terminal of the source which lead 64 is connected to, and in that case the sleeve or tube 18 would be composed at least partially of conductive material or coated with conductive material.

A phenomenon known as current bunching may occur in an electrode of the type shown; it may be said that there is movement within the electrode and the electrode tip structure of a current filament or filaments; current bunching occurs at the arc site, the current flowing down the two concentric tubes 16 and 18 and bunching at the point where the arc 63 makes contact with the electrode face member 12. Forces applied to the current filament within the electrode structure of sufficient magnitude to cause the current filament to move at high speed may lead to arc spot skipping and multiple arc spots or diffused arcing, which generally speaking are desirable since they reduce that portion of the temperature rise of the arcing surface which results from the arc at the site of the arc spot.

The electrode encourages diffused arcing by providing a magnetic field of greater strength on the current filament in bottom 69 than on the arc 63; this follows from the fact that the bottom 69 is closer to the source of the magnetic field than the arc is.

If desired the coil cup or housing 81 may be formed integrally with the electrode face member 12, being maintained in spaced position therefrom by a plurality of arms or studs at spaced intervals around the periphery of the electrode face member, and fixed to both face member and housing.

Figure 2:
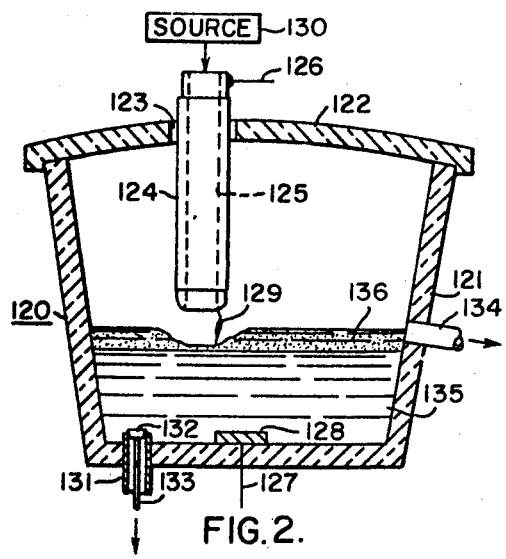
FIG. 2 is a view of apparatus for practicing our invention according to one process thereof.

Particular reference is made now to FIG. 2, where a furnace generally designated 120 is seen to include side walls 121 composed of a refractory material and a cover 122 also composed of a refractory material, and having a passageway 123 therethrough through which extends a nonconsumable electrode 124 having an axial passageway 125 extending the entire length thereof.

Any convenient means, not shown for simplicity of illustration, could be used for supporting and securing the electrode in proper position, in this and all other embodiments. Passageway 125 communicates with a source 130 which may contain ore, reducing agents, or both.

Electrode 124 is connected to a source of potential and the melt in the furnace is also connected to the terminal of the source of potential of opposite polarity by leads 126 and 127 respectively, lead 127 being connected to electrode 128, producing an arc 129 between the electrode and the melt. Whereas a small metallic electrode 128 is shown disposed in the furnace at the bottom of the melt, it will be understood that other means could be employed for completing an electrical circuit to produce the arc 129. The furnace has a normally closed tap 131 in the bottom thereof with a plug 132 adapted to be raised by arm 133 to open the tap to remove the liquid iron from the furnace. The furnace is also seen to have a spout 134 for removing slag. A layer of melt is shown in the furnace and designated 135, with a layer of slag 136 above.

Whereas one electrode is shown in FIG. 2, it will be understood that three spaced electrodes connected to a three phase source could be employed. The source could be Y connected with the center junction connected to the melt, or the source could be a Delta source in which the melt forms a common return path for the various phases.

Arc 129 could be produced between electrode 124 and another non-consumable electrode in the furnace, the latter nonconsumable electrode not being required to have an axial passageway therethrough to practice the process of our invention.

One process for reducing iron ore employing the apparatus of FIG. 1 includes the steps of generating an electric arc zone at an elevated temperature by energizing a circuit including the electrode, introducing iron ore into the furnace through the axial passageway of the electrode, and thereafter introducing a reducing agent into the furnace through the axial passageway of the electrode.

Figure 3:
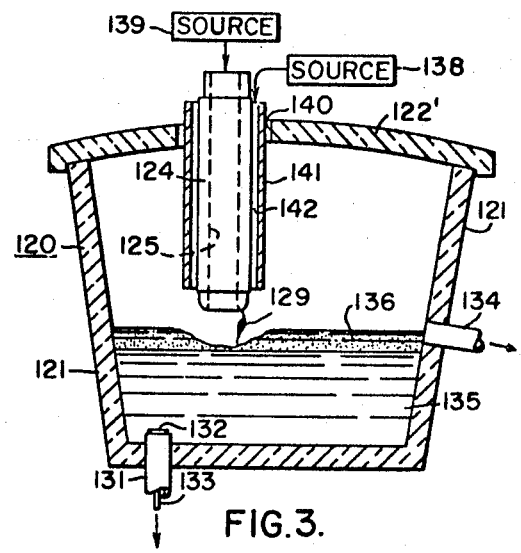
FIG. 3 is a view of apparatus for practicing the process of our invention according to another aspect thereof.

Particular reference is made now to FIG. 3. In FIG. 3, cover 122' has a larger aperture 140 therein through which pass a nonconsumable electrode 124 and spaced therefrom a jacket 141 providing a cylindrical passageway 142 communicating with source 138. Passageway 125 in electrode 124 communicates with source 139. For simplicity of illustration electrode 128 and the leads to the electrode 124 and electrode 128 have been omitted, but it will be understood that in FIG. 3, FIG. 3A, FIG. 5 and FIG. 5A suitable leads means and a suitable source of potential are provided for producing the arc between the electrode and the melt, or between the electrode shown and another electrode in the furnace.

One process of our invention as practiced using the apparatus shown in FIG. 3 includes the steps of generating an electric arc zone at an elevated temperature by energizing the circuit including the nonconsumable electrode, introducing iron ore into the furnace through the passageway of the electrode, and introducing a reducing agent into the furnace through the cylindrical passageway between the outer surface of the electrode and the inner surface of the enclosing jacket.

Figure 3A:
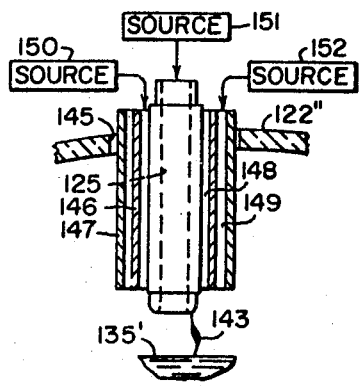
FIG. 3A is a fragmentary view of furnace apparatus for practicing the process of our invention, in which a non-consumable electrode with a passageway therethrough and two spaced jackets are provided, providing in all three passageways for the introduction of ore, reactants and reducing agents into the furnace.

Particular reference is made now to FIG. 3A in which a cover 122'' has an aperture 145 therein large enough to permit the passage of a nonconsumable electrode 124, a first jacket spaced from the electrode designated 146, and a second jacket spaced from the enclosing the first jacket and designated 147, providing in all three passageways for introducing material into the furnace, including the axial passageway 125 of the electrode communicating with source 151, the cylindrical passageway 148 between the nearer jacket and the electrode communicating with source 150, and the cylindrical passageway 149 between the near jacket and the outside or exterior jacket 147 communicating with source 152. An arc 143 is seen taking place to melt 135'.

Our process for iron ore reduction using the apparatus shown in FIG. 3A includes the step of generating an electric arc zone at an elevated temperature by energizing a circuit including a nonconsumable electrode having an axial passageway therethrough, adding ore to the furnace through the axial passageway of the electrode, adding a first reactant to the furnace through a passageway between the electrode and a jacket enclosing the electrode, and adding a second reactant to the furnace through a passageway between the first named jacket and an outer jacket enclosing the first named jacket.

Figure 4:
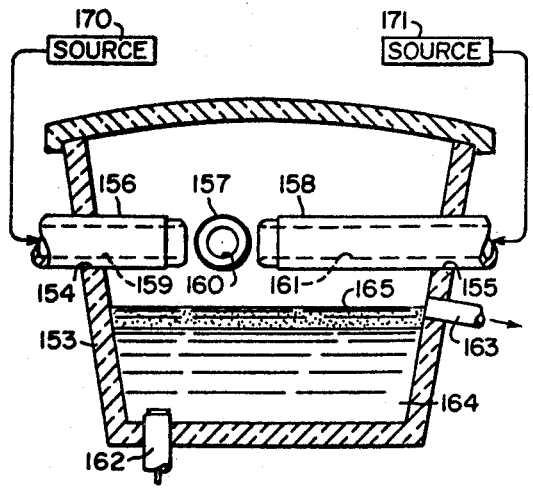
FIG. 4 is a view of a furnace in which three electrodes disposed in horizontal positions are employed.

Particular reference is made now to FIG. 4, where a furnace 153 has three spaced bores or apertures around the walls thereof, two of these being shown at 154 and 155, through which three apertures pass three electrodes of the nonconsumable type, the electrodes being designated 156, 157 and 158 and having axial passageways 159, 160 and 161 respectively. Passageway 159 communicates with source 170 and passageway 161 communicates with source 171. The electrodes 156, 157 and 158 are connected to the three phases of a three phase source, not shown for convenience of illustration. Furnace 153 has a tap 162 and a spout 163, tap 162 being used for obtaining iron from the melt 164, and spout 163 being used for removing slag from the slag layer 165.

Ore may be introduced into the furnace through one or more of the passageways through the electrodes, for example passageway 159 of electrode 154. Reducing agents may be introduced through one or more of the passageways for example passageway 160, or passageway 161. It may also be introduced through passageway 159.

Our process employing the apparatus of FIG. 4 includes the steps of generating an electric arc zone at an elevated temperature by energizing the circuit including three electrodes disposed within a furnace, each of the electrodes having an axial passageway therethrough, introducing ore into the furnace through at least one of the passageways through the electrodes, and introducing a reducing agent into the furnace through at least one of the passageways through the electrodes.

Figure 5:
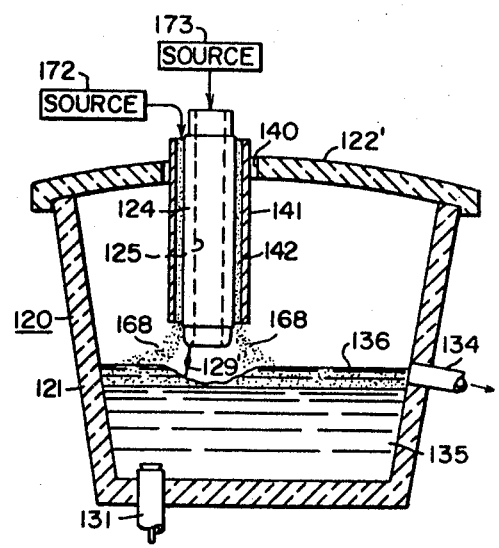
FIG. 5 is a view of a furnace in which the arc is submerged.

Particular reference is made now to FIG. 5, the structure of which is somewhat similar to that of FIG. 3. It will be noted however that in FIG. 5, ore is introduced from source 172 through the passageway 142 between the jacket 141 and the nonconsumable electrode 124, producing a submerged arc 129'. The ore introduced through this tubular passageway is designated 168. Axial passageway 125 communicates with source 173.

One process utilizing the apparatus of FIG. 5 includes the steps of generating an electric arc zone at an elevated temperature by energizing a circuit including the contents of the furnace and a nonconsumable electrode having an axial passageway therethrough, injecting ore into the furnace through a passageway provided between the electrode and an enclosing jacket, and introducing a reducing agent into the furnace through the axial passageway of the electrode.

Figure 5A:
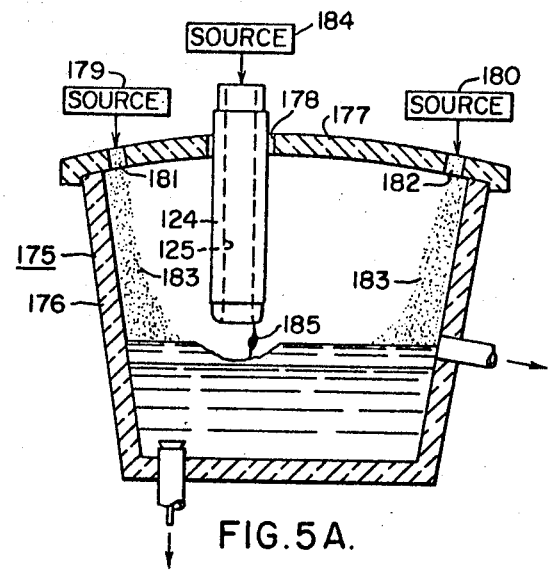
FIG. 5A is a view of a furnace employing a nonconsumable electrode in which ore is introduced along the walls of the furnace.

Particular reference is made now to FIG. 5A. A furnace generally designated 175 has side walls 176 composed of a refractory material and a cover 177 composed of a refractory material, having a passageway 178 therethrough for mounting a nonconsumable electrode, and a plurality of spaced passageways or apertures around the periphery of cover 177 communicating with the inside of the furnace, two of these passageways being shown at 181 and 182 communicating with sources 179 and 180 respectively, through which ore is introduced into the furnace, the ore being designated 183. As before, the nonconsumable electrode 124 has an axial passageway 125 therethrough communicating with source 184 and the circuit is energized to produce arc 185. Additional ore may be introduced through the passageway 125, or the passageway 125 may be used alternately for the introduction of ore and a reducing agent, or the passageway 125 may be used solely for the introduction of a reducing agent into the furnace 175. One process then, employing the apparatus of FIG. 5A, includes the steps of generating an electric arc zone at an elevated temperature by energizing a circuit including the nonconsumable electrode having an axial passageway therethrough, introducing ore into the furnace around the sidewalls thereof, and introducing a reducing agent into the furnace through the axial passageway of the electrode. The process may also include the steps of introducing ore into the furnace around the side walls thereof, and introducing additional ore into the furnace through the axial passageway of the electrode, or alternately introducing a reducing agent into the furnace through the axial passageway of the electrode.

Figure 6:
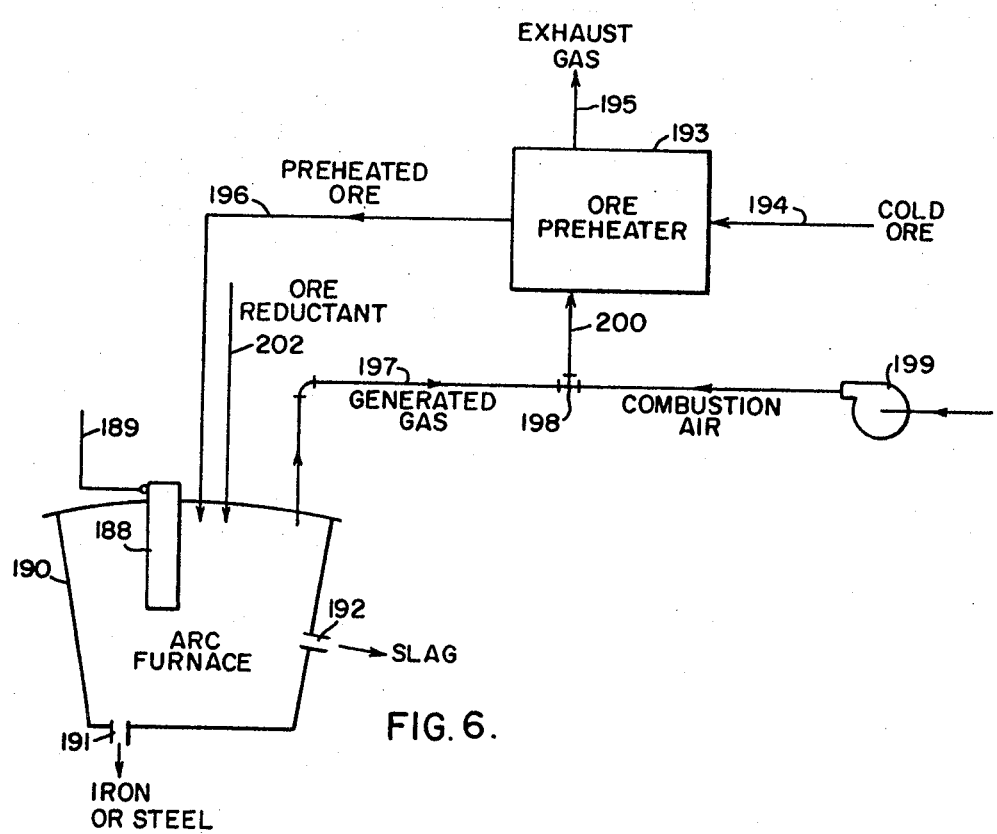
FIG. 6 is a view of our system in which an arc furnace is employed in combination with an ore preheater.

Particular reference is made now to FIG. 6. As previously stated, we have invented a system in which an electric arc furnace is provided with an ore preheater, gas generated in the furnace by the reducing or oxidizing process being fed to the ore preheater along with a mixture of combustion air. Ore is heated in the ore preheater and thereafter fed into the furnace, if desired through the passageway of the electrode, if desired through openings in the cover of the furnace. Ore reductants may be introduced into the furnace through the electrode passageway, or through jackets, or in other desired fashion.

A preferably nonconsumable electrode 188 has a lead 189 thereto for bringing current thereto to produce an arc in a furnace, shown schematically at 190, having tap 191 and slag spout 192. The ore preheater is shown in block form at 193, and it is understood has means for introducing cold ore into the preheater, has means for exhausting gas from the preheater, and has means for transferring the preheated ore from the preheater to the furnace, these means being symbolized by arrows or conduits 194, 195 and 196 respectively. Gas generated in the furnace is conducted by means indicated by the arrow or conduit 197 to the junction 198 where it is mixed with combustion air under pressure obtained from compressor 199, and the resulting mixture is fed by conduit means 200 into the ore preheater 193. Conduit means symbolized by the arrow 202 is provided for introducing a reducing agent or agents into the arc furnace 190.

It will be understood that the furnace 190 includes sealing means so that the generated gas may be utilized in the manner described. Sealing means are well known in the art and need not be described in detail. It will be further understood that the generated gas from the arc furnace is conducted to the preheater where it is burned with air to preheat the ore, the preheated ore being then fed to the arc furnace. This system utilizes directly the energy content of the gas generated during the ore reduction process to preheat the ore coming to the arc furnace. Thereby the electrical power input required to reduce the ore is decreased.

The reducing process may include the usual steps of feeding ore, coke or other reducing agents and flux into the furnace. A fuller discussion of the chemistry involved may be had by reference to a work entitled "General Chemistry" by Linus Pauling, Freeman, and Co. 1947, page 470, and to the "Encyclopedia of Chemical Technology", Interscience, 1952, Vol. 8. The ores of iron are usually first roasted in order to remove water, to decompose carbonates, and to oxidize sulfides. They are then reduced with coke. Ores containing limestone or magnesium carbonate may be mixed with an acidic flux containing an excess of silica, such as sand or clay, in order to make a liquid slag. Limestone may be used as flux for ores containing an excess of silica. Air, which may be preheated, may be blown through the mixture of ore, flux and coke. The solid materials are converted into gases, which must escape from the furnace, and two liquids, molten iron and slag are produced, which are tapped off. The coke is converted largely to carbon monoxide; the iron oxide is reduced by the carbon monoxide forming carbon dioxide, and the combination of acidic and basic oxides from slag. The hot exhaust gases contain some unoxidized carbon monoxide, and this carbon monoxide is burned with air in the ore preheater 193.

Whereas typical chemical reactions are described, it should be understood that the ore preheater 193 is not limited to using carbon monoxide, but that other inflammable gases may be employed, and that gases which merely contain a high amount of heat energy may be utilized in the ore preheater, in which case combustion air from the compressor 199 may be reduced or eliminated.

By way of further summary, a consumable electrode as used in the prior art makes it exceedingly difficult to form suitable furnace structures and material feeding systems which must be complex and costly. Our apparatus as previously stated employs a nonconsumable electrode or electrodes having a metallic or combined metallic-ceramic face, and arcing takes place on this face, with the arc moving over the face by action of a magnetic field resulting from a coil located within the electrode. The electrode has an internal structure such that ore and/or reducing agents may be fed to the arc site, simultaneously or alternately. In addition, in some embodiments a jacket structure surrounding each electrode is provided through which ore and/or reducing agents may be fed to the arc site. The field coil located internally to, but electrically insulating from, the arcing surface provides magnetic flux for driving the arc at high speeds over the arcing surface, and cooling water circuits in the electrode provide cooling of the field coil and the arcing surface. The enclosure, in which the electrodes operate may be similar in many respects to electric furnace shells and roofs now used in the operation for melting steel scrap. In all embodiments of our invention arcing action may take place between two electrodes opposed face to face, or between an electrode and the metal bath. The latter arrangement is especially suitable for three phase operation using three electrodes, as is now generally the practice in steel scrap melting. In our invention, movement of the ore and reducing agents through the arc zone takes place rapidly, commensurate with the higher power density at the arc site. Rotation of the arc by the field coil flux action assures uniform action of the arc on the material being fed to the arc zone. This action is not possible with a prior art consumable electrode where the arc may dwell at one location on the electrode tip for an extended period of time.

Enriched iron ore may be fed into the arc zone as a powder, which eliminates the need and cost of pelletizing the ore, the latter being current practice with enriched ores used in modern blast furnaces. In the latter case the pelletizing is necessary to prevent arching of the burden.

In our invention, suitable sealing means between electrodes and furnaces is employed so that the furnace atmosphere can be controlled, and secondly, so that generated gas can be recovered and used as in FIG. 6.

In all embodiments of our invention, means, not shown for convenience of illustration, may be included for adjusting and controlling the power of the arc or arcs. The use of a nonconsumable electrode permits a holding operation at the furnace without increasing carbon content, such as would occur for the case of consumable graphite or carbon electrodes.

Removal of steel and slag may be performed through taps as shown, or by tilting the whole furnace and pouring from the tap.

In FIG. 3, the material feed of ore and reducing agents takes place through an annular space around the electrode formed by a surrounding cooled jacket. In FIG. 4, the arcing takes place not to the melt but among electrodes. Our invention contemplates and includes specific plants using a nonconsumable electrode and a sealed furnace. The reduction process may use a number of reducing agents including petroleum, and petroleum products such as coal, coke, natural gas or other hydrocarbon gases. Sealing of the furnce so that a slight pressure exists in the furnace allows a combustible gas to be continuously removed from the furnace which contains substantially no nitrogen and therefore is high in heating value. A typical composition to be expected is carbon monoxide 70 to 85 percent, carbon dioxide 10 to 20 percent, hydrogen 5 percent to 12 percent, methane 1 percent.

Our invention includes the use of the combustible gas involved for general purpose heating and for power production using gas or steam turbines.

An additional configuration is shown which operates as a submerged arc. In this case the iron ore is fed into the furnace around the electrode in such quantities that burden of material is continuously maintained over the arc site. This is illustrated in FIG. 5, which shows one of what may be three electrodes. With the submerged arc operation, the burden of material overlying the arc acts to shield the reduced iron from contact with the atmosphere, for the case where the furnace atmosphere is not controlled. Our apparatus offers many advantages over the prior art submerged arc process, in which consumable carbon electrodes are employed.

Suitable supporting means for the electrode(s) and jacket may be provided for any embodiment, these not being shown for convenience of illustration.

By way of further summary, a specific plant configuration may be the case of a sealed direct iron ore reduction furnace where the following processes occur: Iron ore is reduced by the action of the electric arc in the presence of cheap reducing agents such for example as coal; carbon dioxide is generated and made to react with water vapor to synthesize various organic products.

It will be understood that in FIG. 2 if desired means is provided for sealing the passageway 123 in the cover 122; likewise in FIG. 3, means may be provided for sealing passageway 140, and in FIG. 3A means may be provided for sealing passageway 145. In FIG. 5, means may be provided for sealing passageway 140, and in FIG. 5A means may be provided for sealing passageway 178 and the ore introduction passageways including 181 and 182, these sealing means not being shown for convenience of illustration, any convenient sealing means being employed.

Whereas in FIGS. 2, 3, 3A, 5 and 5A we have shown an arc taking place from an electrode to the melt, it will be understood that in all these embodiments, two electrodes could be disposed in the furnace and the arc for heating the melt could take place between electrodes.

In the claims appended hereto the term "reducing agent" is not used as a chemical definition, but includes oxidizing agents as well as reducing agents.

Whereas we have described the processes of our invention and have shown apparatus which we have invented suitable for carrying out the processes of our invention, it will be understood that the drawings and written description are illustrative only and should not be interpreted in a limiting sense.

We claim as our invention:

1. Ore reduction apparatus comprising in combination a furnace, a nonconsumable electrode having an axial passageway therethrough mounted in the furnace, means connecting to the electrode for producing an arc which melts the ore in the furnace, a first jacket disposed externally to the electrode and spaced therefrom, enclosing the electrode and forming a cylindrical passageway between the electrode and the jacket, means for adding ore to the melt in the furnace through one of the passageways, means for adding a reducing agent to the melt in the furnace through one of the passageways, and a second jacket surrounding and spaced from the first jacket and providing an additional cylindrical passageway, and means for adding an additional reactant to the melt in the furnace through the additional cylindrical passageway.

2. In combination, an enclosed electric furnace, means for introducing ore into the furnace to be reduced and means for obtaining iron from the furnace and removing slag therefrom, the last-named two means being constructed and arranged whereby the furnace is substantially sealed except when iron or steel, and slag, are being removed, conduit means connected to the furnace for carrying away gas generated during the reduction process, ore preheater means, for supplying the generated gas to the ore preheater means, means for supplying cold ore to the ore preheater, means for conducting ore after being heated in the preheater to the furnace, and means for adding air under pressure to the generated gas before it is supplied to the ore preheater.

* * * * *